US012429185B2

(12) United States Patent
Schüler

(10) Patent No.: US 12,429,185 B2
(45) Date of Patent: Sep. 30, 2025

(54) HEADLAMP FOR A MOTOR VEHICLE AND APPEARANCE LIGHT MODULE FOR SUCH A HEADLAMP

(71) Applicant: Hella GmbH & Co. KGaA, Lippstadt (DE)

(72) Inventor: Fabian Schüler, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/636,773

(22) Filed: Apr. 16, 2024

(65) Prior Publication Data

US 2024/0263756 A1 Aug. 8, 2024

Related U.S. Application Data

(63) Continuation of application No. PCT/EP2022/077528, filed on Oct. 4, 2022.

(51) Int. Cl.
*F21S 41/265* (2018.01)
*F21S 41/143* (2018.01)

(52) U.S. Cl.
CPC ........... *F21S 41/265* (2018.01); *F21S 41/143* (2018.01)

(58) Field of Classification Search
CPC .............................. F21S 41/265; F21S 41/143
See application file for complete search history.

(56) References Cited

U.S. PATENT DOCUMENTS

| | | | | |
|---|---|---|---|---|
| 10,352,523 | B2 * | 7/2019 | Nishimura | F21S 41/27 |
| 2019/0003676 | A1 * | 1/2019 | Franc | F21S 43/14 |
| 2022/0003375 | A1 * | 1/2022 | Sugiyama | F21S 41/663 |
| 2022/0074564 | A1 * | 3/2022 | Li | F21S 41/255 |
| 2023/0043186 | A1 * | 2/2023 | Zhu | F21S 41/255 |
| 2023/0096707 | A1 * | 3/2023 | Hagedorn | F21S 41/143 362/511 |

FOREIGN PATENT DOCUMENTS

| | | | |
|---|---|---|---|
| DE | 4305585 | A1 | 8/1994 |
| DE | 19938439 | A1 | 2/2000 |
| DE | 10145963 | A1 | 4/2002 |
| DE | 102011085314 | B3 | 4/2013 |
| DE | 102012208516 | A1 | 11/2013 |
| DE | 102017115899 | A1 | 1/2019 |

(Continued)

*Primary Examiner* — Christopher E Dunay
(74) *Attorney, Agent, or Firm* — Husch Blackwell LLP

(57) ABSTRACT

An appearance light module for motor vehicle headlamp comprises at least one light source and one secondary optical element. The secondary optical element has an intake geometry with an entry surface for the light generated by the at least one light source, and an emission geometry with an exit surface for the light passing through the entry surface of the intake geometry. The exit surface of the emission geometry can be seen from outside the motor vehicle when the headlamp is installed in the motor vehicle. The appearance light module is not suitable for generating a low beam light distribution or a high beam light distribution. The appearance light module has no primary optical element, and the light from the at least one light source reaches the entry surface of the secondary optical element without being reflected and without passing through a refractive or diffractive optical element.

20 Claims, 1 Drawing Sheet

(56) References Cited

FOREIGN PATENT DOCUMENTS

| | | | |
|---|---|---|---|
| DE | 102018207276 | A1 | 11/2019 |
| DE | 102018113768 | A1 | 12/2019 |
| EP | 2012056 | A1 | 1/2009 |
| EP | 2230446 | A1 | 9/2010 |
| EP | 2708800 | A2 | 3/2014 |
| EP | 3671019 | A1 | 6/2020 |

* cited by examiner

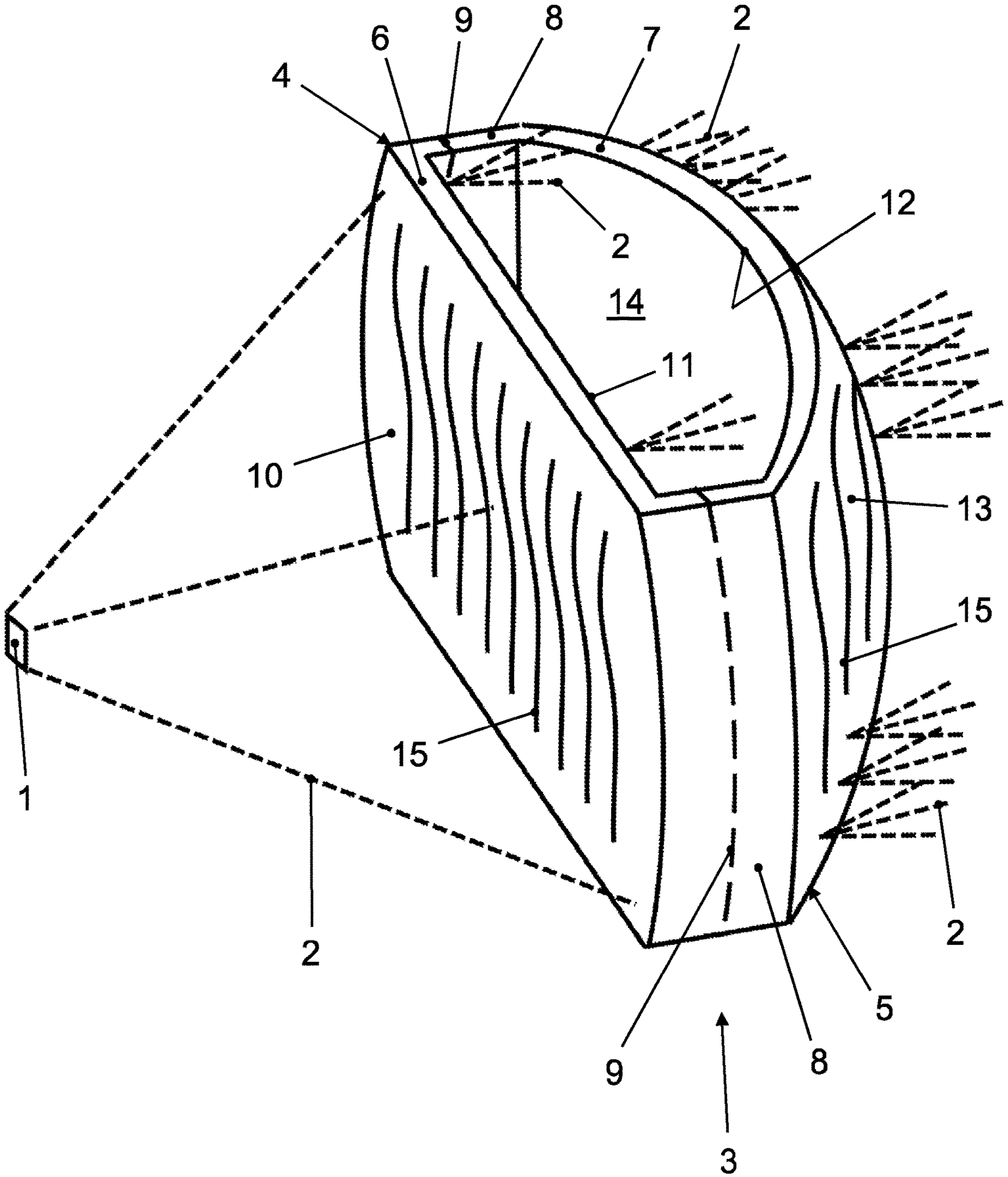
1
2
3
4
5
6
7
8
9
10
11
12
13
14
15

HEADLAMP FOR A MOTOR VEHICLE AND APPEARANCE LIGHT MODULE FOR SUCH A HEADLAMP

CROSS REFERENCE

This application claims priority to PCT Application No. PCT/EP2022/077528, filed Oct. 4, 2022, which itself claims priority to German Application No. 10 2021 127813.9, filed Oct. 26, 2021, the entireties of both of which are hereby incorporated by reference.

FIELD OF THE INVENTION

The present invention relates to an appearance light module for a headlamp in a motor vehicle, and a headlamp for a motor vehicle that has such an appearance light module.

BACKGROUND OF THE INVENTION

Styling and design play an extremely important role in automobile headlamps, in particular because manufacturers use these components to improve the appearance of the vehicle and heighten its recognition value. The current trend is to use so-called appearance light modules, also referred to as appearance modules or fake modules. These modules have a limited functionality, such as the generation of OS values, or they have no photometric functionality, such that they only emit a small amount of light when a main light module generates a low beam light, for example. Appearance light modules are used as a design element and imitate other main light modules that generate high or low beam light distributions.

DE 10 2012 208 516 A1 discloses a vehicle headlamp that has a low beam light module and an appearance light module. The modules are designed, placed, and aligned such that less than 30% of the light emitted by the vehicle headlamp above the light/dark boundary and horizontally in the direction of travel is generated by the low beam light module. Moreover, a daytime running light distribution can be generated by the appearance light module, in which case the low beam light module is deactivated. The goal is for the appearance of the headlamp to always be characterized by the appearance light module for an observer looking toward the headlamp along the beam path. There are no explanations in DE 10 2012 208 516 A1 regarding the how the headlamp is actually designed from a technological perspective.

A vehicle headlamp that contains a main light module and a secondary light module is disclosed in DE 10 2018 113 768 A1, both modules of which contain a primary optical element and a secondary optical element with a projection lens. The main light module can generate a low beam light distribution, and the secondary light module can generate a high beam light distribution. The secondary light module can also generate a weaker secondary light when the high beam is not activated. The secondary light results in a uniform light emission through the projection lens. In particular, the appearance of the secondary light module, when it is not being used at night for the high beam light distribution, resembles that of the main light module.

Prior appearance light modules resemble the secondary light module described in DE 10 2018 113 768 A1, and also use primary optical elements, a secondary optical element with a projection lens, and potentially other optical elements or reflectors for focusing light and generating the appearance function. This requires a large number of components, resulting in complicated installation and adjustment processes that demand a great deal of precision. This increases production costs. Furthermore, many of the optical concepts of the appearance light modules do not allow for complete homogenous lighting of the projection lens, and have a warm appearance, in which the light sources for the appearance light module can be seen as a punctiform light source.

BRIEF SUMMARY OF THE INVENTION

The fundamental problem addressed by the present invention is to create an appearance light module of the type specified above, which can be produced less expensively, and nevertheless has the cold and/or warm appearance of a module functioning as the main light. Furthermore, a headlamp of the type specified above is to be obtained that contains such an appearance light module.

In an example, the appearance light module contains at least one light source and one secondary optical element, which has an intake geometry with an entry surface for the light generated by the at least one light source, and an emission geometry with an exit surface for the light passing through the entry surface of the intake geometry, in which the appearance light module is designed such that the exit surface of the emission geometry can be seen from outside the motor vehicle when the headlamp is installed therein, the appearance light module is not designed to generate a low beam light distribution or a high beam light distribution, the appearance light module does not have a primary optical element, and is designed such that the light from the at least one light source reaches the entry surface of the secondary optical element without being reflected or passing through a refractive or diffractive optical element. It has proven to be a major advantage that the light from the light source, which can be a light emitting diode (LED), shines directly on the secondary optical element of the appearance light module, i.e. without additional optical components such as a primary optical element or a reflector. This requires a lower number of optical components for generating the appearance function in the beam path, resulting in lower production costs. Moreover, optical losses are reduced. Furthermore, installation and adjustment complexity is reduced, resulting in a much more robust design.

In an example, the appearance light module contains at least one light source and one secondary optical element, which has an intake geometry with an entry surface for the light generated by the at least one light source, and an emission geometry with an exit surface for the light passing through the entry surface of the intake geometry, in which the appearance light module is designed such that the exit surface of the emission geometry can be seen from outside the motor vehicle when the headlamp is installed therein, the appearance light module is not designed to generate a low beam light distribution or a high beam light distribution, the intake geometry and emission geometry are separated from one another by an air gap or hollow chamber, the intake geometry has an exit surface for the light that enters the entry surface, and the emission geometry has an entry surface for the light exiting the exit surface of the intake geometry. This design of the secondary optical element results in an appearance light module that requires much less material than conventional projection lenses for a module that functions as the main light. This reduces the weight and costs thereof. The reduction in materials is obtained by the air gap or hollow chamber between the intake geometry and the emission geometry, because in conventional projection lenses, this air gap or hollow chamber is filled with the material from which the projection lens is made.

The entry surface and exit surface of the intake geometry can be on opposite sides of a first substrate, and the entry surface and exit surface of the emission geometry can be on opposite sides of a second substrate, separated from the first substrate by the air gap or hollow chamber. The two substrates can be connected together, in particular at the outer edges of the exit surface of the intake geometry and the entry surface of the emission geometry, or the two substrates do not have to be connected to one another. The first alternative, in which the two substrates are connected to one another, may be more expensive because of the hollow chamber formed between the first and second substrates when the secondary optical element is produced in a plastic injection molding process, in particular because of the higher costs for the tools. This reduces the difficulties in adjusting the two substrates to one another, however. The second alternative, in which the two substrates are not connected to one another, can be produced with lower production costs in a plastic injection molding process.

The exit surface of the emission geometry can be curved. Consequently, the exit surface of the emission geometry can have more or less the same or similar appearance as that of the projection lens for a main light module in the headlamp.

In particular, the secondary optical element can be designed such that the exit surface of the emission geometry that is visible from outside the motor vehicle when the headlamp is installed therein looks like a projection lens. The exit surface of the emission geometry can be angular or curved, and the curvature of the exit surface of the emission geometry can be planar or convex, and the design of the surface can be spherical, aspherical, or not precisely geometrically defined.

The intake geometry can be designed to light the exit surface of the emission geometry in a defined manner, in particular partially and/or homogenously. Consequently, the warm appearance of the appearance light module can resemble that of a main light module, in particular the exit surface of the emission geometry with regard to homogeneity and brightness, or it can be lit the same as the exit surface of a projection lens for the main light module.

The entry surface of the intake geometry and/or the exit surface of the emission geometry can have a refractive or diffractive structure or coating for diffusing or diffracting the light passing through it. Furthermore, the exit surface of the intake geometry and/or the entry surface of the emission geometry can have a refractive or diffractive structure or coating for diffusing or diffracting the light passing through it. The homogeneity of the lighting of the exit surface of the emission geometry can be improved by these structures and/or coatings.

The appearance light module can be designed for a supplementary light function, e.g. daytime running lights, positioning lights, or generating OS values for a light distribution. Consequently, the appearance light module can also contribute to the active photometry of the headlamp in generating the low beam light distribution with the main light module, in addition to its function as the appearance light module.

In an example, the headlamp contains an appearance light module according to the invention, and a main light module for generating at least part of a low beam light distribution and/or high beam light distribution.

The main light module can contain at least one light source, one primary optical element, and a secondary optical element in the form of a projection lens with an exit surface, in which the main light module is designed such that the exit surface of the secondary optical element can be seen from outside the vehicle when it is installed therein. The exit surface of the projection lens for the main light module and the exit surface for the emission geometry of the appearance light module resemble one another, in particular with regard to their shape and/or size. Specifically, the headlamp can be designed such that the appearance of the exit surface of the projection lens in the main light module and the appearance of the exit surface of the emission geometry in the appearance light module are similar or identical for an observer looking at the headlamp from the front or from above, at least when the main light module is generating a low beam light distribution.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 shows a schematic perspective illustration of an appearance light module according to the invention for a headlamp for a motor vehicle.

DETAILED DESCRIPTION OF THE DRAWINGS

The embodiment of an appearance light module shown in FIG. 1 contains a light source 1, in particular in the form of a light emitting diode, which emits light 2 when operating, and a secondary optical element 3, through which at least part of the light 2 from the light source 1 can pass.

The secondary optical element 3 contains an intake geometry 4 and an emission geometry 5. The intake geometry 4 is formed on a first substrate 6 and the emission geometry 5 is formed on a second substrate 7. The two substrates 6, 7 are connected to one another by webs 8 on the edges thereof.

The substrates 6, 7 do not have to be connected to one another. This is indicated by the broken line 9 in FIG. 1.

The intake geometry 4 has an entry surface 10 for the light 2 generated by the light source 1, and an exit surface 11 for the light that enters the entry surface 10. The emission geometry 5 has an entry surface 12 for the light exiting the exit surface 11 of the intake geometry 4, and an exit surface 13 for the light that enters the entry surface 12 of the emission geometry 5. The exit surface 11 on the intake geometry 4 and the entry surface 12 on the emission geometry 5 are spaced apart from one another along the beam path of the light 2, such that an air gap 14, or hollow chamber, is formed between the exit surface 11 of the intake geometry 4 and the entry surface 12 of the emission geometry 5.

The appearance light module is designed such that the exit surface 13 of the emission geometry 5 can be seen from outside the motor vehicle when the headlamp is installed therein.

In the illustrated exemplary embodiment the entry surface 10 and exit surface 11 of the intake geometry 4 are planar. The entry surface 12 of the emission geometry 5 is concave, and the exit surface 13 of the emission geometry 5 is convex. The surfaces of the entry surfaces 10, 12 and exit surfaces 11, 13 can have arbitrary designs, e.g. spherical, aspherical, free-form, planar, convex, or concave. Many other surface designs can also be used.

In the exemplary embodiment shown in the illustration, the entry surface 10 for the intake geometry 4 and the exit surface 13 for the emission geometry 5 each have schematically indicated refractive or diffractive structures 15. Structured coatings can be used instead of these structures 15. The structures 15 can diffuse or diffract the light 2 striking the entry surface 10 of the intake geometry such that the exit surface 13 of the emission geometry 5 is fully, homogenously lit.

There only has to be structures 15, or a coating with such structures, on the entry surface 10 of the intake geometry 4, leaving the exit surface 13 of the emission geometry unstructured, or without such a coating. It is also possible to only form structures 15, or place a coating with such structures, on the exit surface 13 of the emission geometry 5, leaving the entry surface 10 of the intake geometry 4 unstructured, or without such a coating.

It is also possible to form structures on the exit surface 11 of the intake geometry 4 and/or the entry surface 13 of the emission geometry 5, instead of, or in addition to, the structures 15 on the entry surface 10 of the intake geometry 4 and/or the exit surface 13 of the emission geometry 5.

Because of the comparatively complete, homogenous lighting of the exit surface 13 on the emission geometry 5, the warm and cold appearance of the appearance light module resembles that of a main light module. This results in an appearance light module with an appearance function.

The light from the appearance light module can contribute to active photometry in an embodiment that is not illustrated, e.g. the generation of overhead sign values or supplementary lighting functions such as daytime running lights or a positioning light.

The appearance light module can be integrated in a headlamp according to the invention, which contains a main light module for generating at least part of a low beam light distribution and/or high beam light distribution, in addition to the appearance light module. The main light module can contain at least one light source, one primary optical element, and one secondary optical element serving as a projection lens, which has an exit surface. The main light module is also designed such that the exit surface of the secondary optical element is visible from outside the vehicle when the headlamp is installed therein.

The exit surface on the projection lens in the main light module and the exit surface 13 on the emission geometry 5 in the appearance light module can resemble one another, in particular in their shape and/or size. The headlamp can be designed in particular such that at least when the main light module generates a low beam light distribution, the appearance of the exit surface of the projection lens in the main light module resembles the appearance of the exit surface 13 of the emission geometry 5 of the appearance light module for an observer looking at the headlamp. Consequently, the appearance light module can fulfill the desired appearance function, or contribute to the low beam light distribution generated by the main light module.

LIST OF REFERENCE SYMBOLS

1 light source
2 light emitted by the light source
3 secondary optical element
4 intake geometry
5 emission geometry
6 first substrate
7 second substrate
8 web connecting the substrates
9 broken line indicating the separation of the substrates
10 entry surface for the intake geometry
11 exit surface for the intake geometry
12 entry surface for the emission geometry
13 exit surface for the emission geometry
14 air gap between the intake geometry and the emission geometry
15 refractive or diffractive structure

I claim:

1. An appearance light module for a headlamp for a motor vehicle, the appearance light module comprising:
at least one light source; and
one secondary optical element having:
an intake geometry with an entry surface for light generated by the at least one light source, and
an emission geometry with an exit surface for the light passing through the entry surface of the intake geometry;
wherein the exit surface of the emission geometry is visible from outside the motor vehicle when the headlamp is installed in the motor vehicle,
wherein the appearance light module is not suitable for generating a low beam light distribution or a high beam light distribution, and
wherein light from the at least one light source reaches the entry surface of the secondary optical element without being reflected and without passing through a refractive or diffractive optical element.

2. The appearance light module according to claim 1, wherein the exit surface of the emission geometry is curved.

3. The appearance light module according to claim 1, wherein the exit surface of the emission geometry that can be seen from outside the motor vehicle when the headlamp is installed in a motor vehicle looks like a projection lens.

4. The appearance light module according to claim 1, wherein the intake geometry causes the exit surface of the emission geometry to be lit in a defined manner.

5. The appearance light module according to claim 1, wherein the entry surface of the intake geometry and/or the exit surface of the emission geometry have a refractive or diffractive structure coating for diffusing or diffracting the light passing through it.

6. The appearance light module according to claim 1, wherein the appearance light module fulfills a supplementary lighting function.

7. The appearance light module according to claim 6, wherein the supplementary lighting function is e.g. daytime running lights, positioning lights, or generation of OS values in a light distribution.

8. A headlamp for a motor vehicle comprising:
an appearance light module according to claim 1, and a main light module for generating at least a portion of a low beam light distribution and/or a high beam light distribution.

9. The headlamp according to claim 8, wherein the main light module contains at least one light source, one primary optical element, and one secondary optical element serving as a projection lens, which has an exit surface, wherein the main light module is designed such that the exit surface of the secondary optical element is visible from outside the vehicle when installed therein.

10. The headlamp according to claim 9, wherein the exit surface of the projection lens in the main light module and the exit surface of the emission geometry in the appearance light module resemble one another.

11. The headlamp according to claim 10, wherein the exit surface of the projection lens in the main light module and the exit surface of the emission geometry in the appearance light module have the same shape and/or size.

12. The headlamp according to claim 9, wherein the appearance of the exit surface of the projection lens in the main light module and the appearance of the exit surface of the emission geometry in the appearance light module are similar or identical for an observer looking at the headlamp from the front or from above, at least when the main light module is generating a low beam light distribution.

13. The headlamp according to claim 1, wherein the entry surface of the emission geometry is concave, and the exit surface of the emission geometry is convex.

14. An appearance light module for a headlamp for a motor vehicle, the appearance light module comprising:
at least one light source; and
one secondary optical element having:
an intake geometry with an entry surface for light generated by the at least one light source, and
an emission geometry with an exit surface for the light passing through the entry surface of the intake geometry;
wherein the exit surface of the emission geometry is visible from outside the motor vehicle when the headlamp is installed in the motor vehicle,
wherein the appearance light module is not suitable for generating a low beam light distribution or a high beam light distribution,
wherein the intake geometry and the emission geometry are separated from one another by an air gap or hollow chamber,
wherein the intake geometry has an exit surface for the light entering the entry surface, and
wherein the emission geometry has an entry surface for the light exiting the exit surface of the intake geometry.

15. The appearance light module according to claim 14, wherein light from the at least one light source reaches the entry surface of the secondary optical element without being reflected and without passing through a refractive or diffractive optical element.

16. The appearance light module according to claim 14, wherein the entry surface and exit surface of the intake geometry are formed on opposite sides of a first substrate and the entry surface and exit surface of the emission geometry are on opposite sides of a second substrate separated from the first substrate by the air gap or hollow chamber.

17. The appearance light module according to claim 16, wherein the two substrates are connected to one another.

18. The appearance light module according to claim 17, wherein the two substrates are connected to one another at outer edges of the exit surface of the intake geometry and the entry surface of the emission geometry.

19. The appearance light module according to claim 17, wherein the two substrates are not connected to one another.

20. The appearance light module according to claim 14, wherein the exit surface of the intake geometry and/or the entry surface of the emission geometry have a refractive or diffractive structure coating for diffusing or diffracting the light passing through it.

* * * * *